United States Patent

Ott

[15] 3,690,191
[45] Sept. 12, 1972

[54] DEVICE FOR CONVERTING A RECIPROCATING MOTION INTO A STEPWISE ROTARY MOTION

[72] Inventor: Hanns Ott, Nurnberg, Germany

[73] Assignee: Siemens Aktiengesellschaft, Berlin and Munich, Germany

[22] Filed: Oct. 21, 1971

[21] Appl. No.: 191,209

[30] Foreign Application Priority Data

Oct. 22, 1970 Germany..........P 20 51 764.0

[52] U.S. Cl. .......................74/142, 310/21, 310/22, 310/37, 58/116
[51] Int. Cl................................................H02k 7/06
[58] Field of Search ........310/20, 21, 22, 37; 74/126, 74/142, 143; 58/116 M, 53 D; 335/228

[56] References Cited

UNITED STATES PATENTS

| | | | |
|---|---|---|---|
| 3,411,368 | 11/1968 | Schneiter | 74/142 |
| 3,518,464 | 6/1970 | Kawakami et al. | 310/22 |
| 3,519,856 | 7/1970 | Clifford | 310/22 |
| 3,581,128 | 5/1971 | Meisner | 310/21 |

*Primary Examiner*—D. F. Duggan
*Attorney*—Arthur E. Wilfond et al.

[57] ABSTRACT

A device for converting reciprocating motion into stepwise rotary motion has a rotatable shaft, a first pole wheel mounted on the shaft and having a plurality of north poles equally spaced one from the other so as to define a corresponding plurality of pole gaps, a second pole wheel mounted on the shaft axially of the first pole wheel and having a plurality of south poles equally spaced one from the other so as to also define a corresponding plurality of pole gaps, and a member for magnetically coupling the first pole wheel with the second pole wheel. An actuating magnet is provided as is also a drive device connected to the actuating magnet for imparting to the latter a reciprocating radial motion in a region outside the pole wheels and in a direction substantially parallel to the shaft.

5 Claims, 2 Drawing Figures

PATENTED SEP 12 1972

3,690,191

DEVICE FOR CONVERTING A RECIPROCATING MOTION INTO A STEPWISE ROTARY MOTION

My invention relates to an arrangement for the conversion of a reciprocating motion of a first part of a device into a stepwise rotary motion of defined direction of a second part of the device.

It has been suggested to connect a thrust pawl with a pendulum driven by a clock mechanism or another drive mechanism. The thrust pawl drives a rotatably supported wheel provided with suitable gearing which is prevented by a ratchet from turning backwards when the thrust pawl returns. The thrust pawl, the wheel and the ratchet are subjected to wear in this device because of the continuously occurring mutual engagement. The noise accompanying the engagement is also disturbing.

It is an object of my invention to provide a device of the kind described above in which the individual parts are not subjected to mechanical wear and which operates completely without noise.

According to the invention, I arrange on a shaft, a first pole wheel provided with north poles arranged with equal spacing, and at an axial distance from the first pole wheel, I provide a second pole wheel connected with the first pole wheel in a magnetically conducting manner. The second pole wheel is provided with south poles arranged with equal spacing and the north or south poles, respectively, of one pole wheel are opposite the pole gaps of the other pole wheel. An actuating magnet is moved back and forth by the first part of the device in a radial direction outside of the pole wheels and extends essentially parallel to the shaft. The pole distance of the actuating magnet in the direction of the shaft is chosen smaller than the distance between the two pole wheels, and that further, a return bar is arranged, in the radial direction outside of the pole wheels, parallel to the shaft. The center distance between the actuating magnet and the return bar in the peripheral direction differs by less than the width of one pole or the width of one pole gap of the pole pitch or of an integral multiple of the pole pitch.

The actuating magnet has end faces facing toward the pole gaps and each of these end faces has an area smaller than the region defined by one of the pole gaps.

According to a further feature of the invention, a particularly simple construction is afforded by providing ferromagnetic toothed discs as pole wheels which are connected in magnetic conductive relation with the end faces of a permanent magnet which is arranged on the shaft and is magnetized axially.

The direction of rotation of the second part of the device can be changed in a simple manner if the return bar is arranged so as to be movable in the peripheral direction.

Although the invention is illustrated and described herein as a device for converting reciprocating motion of a first part of the device to stepwise rotary motion of defined direction of a second part thereof, it is nevertheless not intended to be limited to the details shown, since various modifications may be made therein within the scope and the range of the claims. The invention, however, together with additional objects and advantages will be best understood from the following description and in connection with the accompanying drawings in which:

Figure 1:
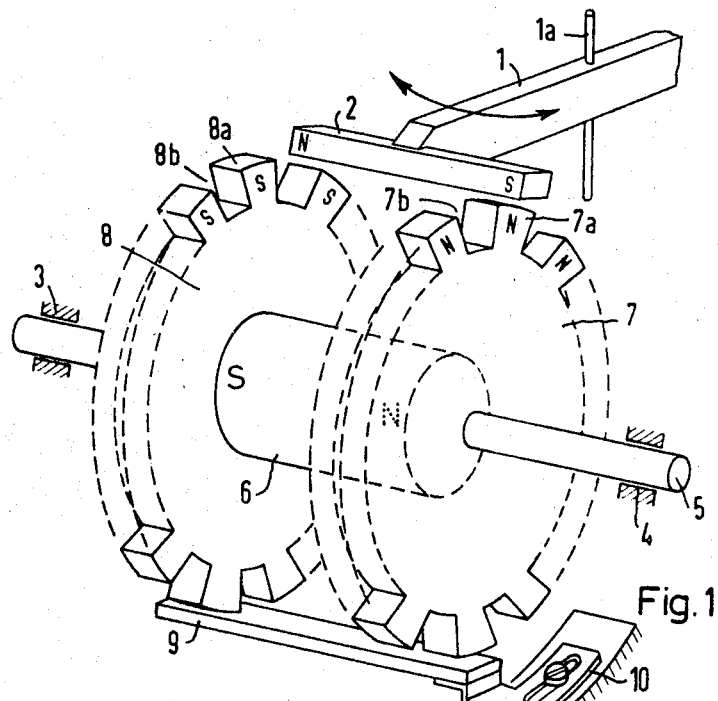
FIG. 1 is a perspective view of the device according to the invention.

In FIG. 1 is shown a member designated with reference numeral 1 and which is pivoted about a pendulum axis 1a. With the member 1 is connected an actuating magnet 2 configured as a small bar magnet. An axially magnetized permanent magnet 6 is arranged on the shaft 5 which is rotatably supported in the bearings 3 and 4. The magnet 6 is connected in magnetic conductive relation at its end faces with pole wheels 7 and 8, respectively. The pole wheels 7 and 8 consist of ferromagnetic material and are configured as toothed discs having teeth 7a and 8a, respectively. The teeth 7a and 8a form north and south poles respectively. The toothed discs 7 and 8 are here arranged so that the teeth 7a or 8a of one toothed disc are always opposite pole or tooth gaps 8b or 7b, respectively of the other toothed disc. A return bar 9 also consisting of ferromagnetic material is arranged opposite the teeth of the two toothed discs without making contact. The center distance between the return bar 9 and the actuated magnet 2 in the peripheral direction is larger or smaller by less than the width of a tooth or tooth gap than the pole pitch or an integral multiple of the pole pitch. The term pole pitch is understood to mean the center distance between two teeth of a toothed disc.

Figure 2:
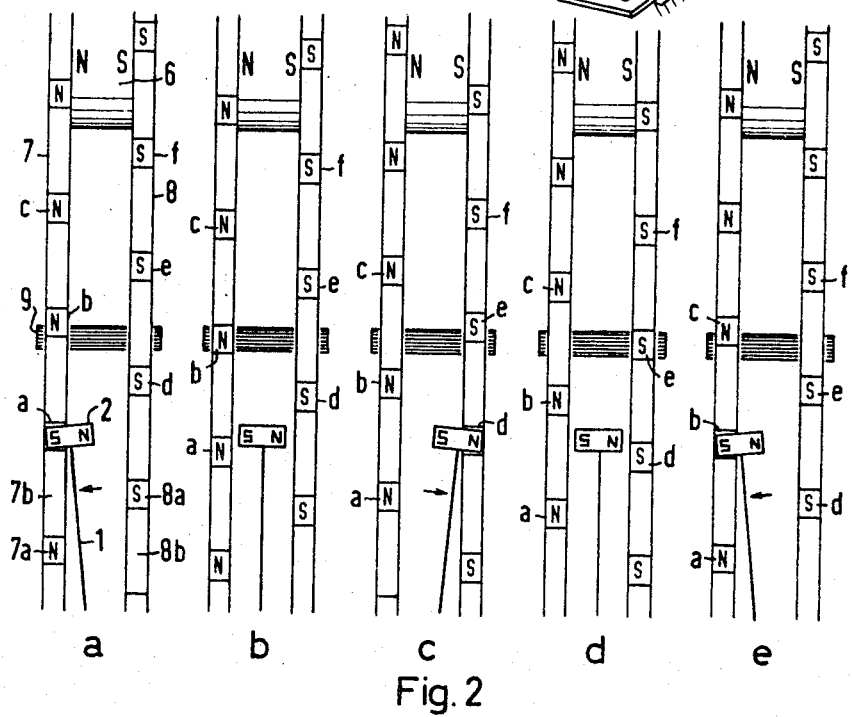
FIGS. 2a to 2e show the individual switching steps in a developed presentation of the arrangement.

With reference to the device according to the invention as shown in the developed presentation of FIG. 2, the operation of the device of the invention will be explained in the following.

Reference letters a, b, c designate three teeth or north poles, respectively, of the first toothed disc 7 of the first pole wheel, and reference letters d, e, f, designate three respective south poles of the second toothed disc 8 or the second pole wheel. The toothed discs are magnetized by the permanent magnet 6 so that the teeth act like magnetic poles. Depending on the disposition of the permanent magnet 6, the teeth a to c develop as magnetic north poles and the teeth d to f as magnetic south poles. The actuating magnet 2 is connected with the member 1 in such a manner that its two magnet poles are opposite teeth of the toothed discs magnetized with opposite polarities.

Starting with the position shown in FIG. 2a, the following mode of operation is obtained. A drive means comprising member 1 imparts to the actuating magnet 2 a reciprocating radial motion in a region outside the pole wheels and in a direction substantially parallel to the shaft 5.

Because of the oscillations of the member 1 the actuating magnet 2 is moved toward the first toothed disc 7. The tooth a, magnetized as a north pole, of the first toothed disc 7 is hereby attracted by the south pole of the actuating magnet and remains underneath it. The next tooth b, magnetized as north pole, overlaps only little with the return bar 9 because of the condition that the distance of the return bar 9 from the actuating magnet 2 corresponds to the pole pitch or a multiple thereof diminished or increased by less than the width of a tooth or tooth gap.

The return member or return bar 9 is arranged parallel to the shaft so as to make the center distance between the bar and the actuating magnet measured along the periphery of a pole wheel correspond to $n$ times the pole pitch less an amount corresponding to at least one of the width in peripheral direction of a pole and the width in peripheral direction of a pole gap where $n$ is a whole number and $n \geq 1$. The position of the return member 9 can be adjusted in the peripheral direction of the pole wheels with the position adjustor 10.

As soon as the member 1 with the actuating magnet 2 swings back, (FIG. 2b), the tooth b is pulled completely under the return bar 9 and the toothed discs 7 and 8 are thereby pulled up through a corresponding angle. Because of this pulling up action, a certain asymmetry is created, so that the actuating magnet 2 does not swing over the second toothed disc 8 in the center between the teeth d and e, but at a smaller distance from the tooth d, which is magnetized as a south pole. This tooth is thereby attracted by the north pole of the actuating magnet 2, and the stepwise rotary motion continues (FIG. 2c). When the member 1 swings back, the next tooth e, magnetized as a south pole, is attracted by the return bar 9 (FIG. 2d) and the toothed discs are thereby again pulled up by a corresponding angle. Thereby, the distance of the actuating magnet 1 from the tooth b, magnetized as a north pole, is smaller than from the tooth a, also magnetized as a north pole, so that when the actuating magnet approaches, the tooth b is pulled under the south pole of the actuating magnet, (FIG. 2e). With this, the initial position is reached once more and the stepwise rotary motion of the toothed discs is continued in the sequence described with the further oscillations or reciprocating motions of the member 1.

In order to reduce the moment of inertia, it may be desirable to provide the return bar as a permanent magnet instead of the permanent magnet arranged between the toothed discs.

The arrangement according to the invention can be used in an advantageous manner as a timing mechanism for timers or delay relays by coupling a switching element directly or via a gear box with the shaft 5 of the arrangement. This switching element is then actuated after the preset time has passed and triggers a control command.

If desired, the operating principle of the device according to the invention can be reversed wherein by actuating the toothed discs by a power drive and the pivoted member can be driven via the actuating magnet, the latter then being a follower magnet.

I claim:

1. A device for converting reciprocating motion into stepwise rotary motion comprising a rotatable shaft, a first pole wheel mounted on said shaft and having a plurality of north poles equally spaced one from the other so as to define a corresponding plurality of pole gaps, a second pole wheel mounted on said shaft axially of said first pole wheel and having a plurality of south poles equally spaced one from the other so as to also define a corresponding plurality of pole gaps, and means for magnetically coupling said first pole wheel with said second pole wheel, said first pole wheel being positioned on said shaft so as to place the north poles and the pole gaps thereof opposite the pole gaps and the south poles of said second wheel respectively, an actuating magnet, drive means connected to said actuating magnet for imparting to the latter a reciprocating radial motion in a region outside said pole wheels and in a direction substantially parallel to said shaft, said actuating magnet having a spacing between its poles less than the distance between said pole wheels, and a return member arranged parallel to said shaft so as to make the center distance between said member and said actuating magnet measured along the periphery of a pole wheel correspond to n times the pole pitch less an amount corresponding to at least one of the width in peripheral direction of a pole on the width in peripheral direction of a pole gap where $n$ is a whole number and $n \geq 1$.

2. Device of claim 1, said pole wheels being respective discs of ferromagnetic material, and said means for magnetically coupling said first pole wheel with said second pole wheel being a permanent magnet mounted on said shaft and having end faces in magnetically conducting relation to said discs, respectively.

3. Device of claim 1, said drive means comprising a swivable member connected to said actuating magnet, said swivable member being swivable about an axis perpendicular to said shaft.

4. Device of claim 1, said actuating magnet having end faces facing toward said pole gaps, each of said end faces having an area smaller than the region defined by one of said pole gaps.

5. Device of claim 1 comprising means for adjusting the position of said return member in the peripheral direction of said pole wheels.

* * * * *